Dec. 29, 1931.  F. W. SCHWINN  1,838,872
REFRIGERATING APPARATUS
Filed March 16, 1928  3 Sheets-Sheet 2
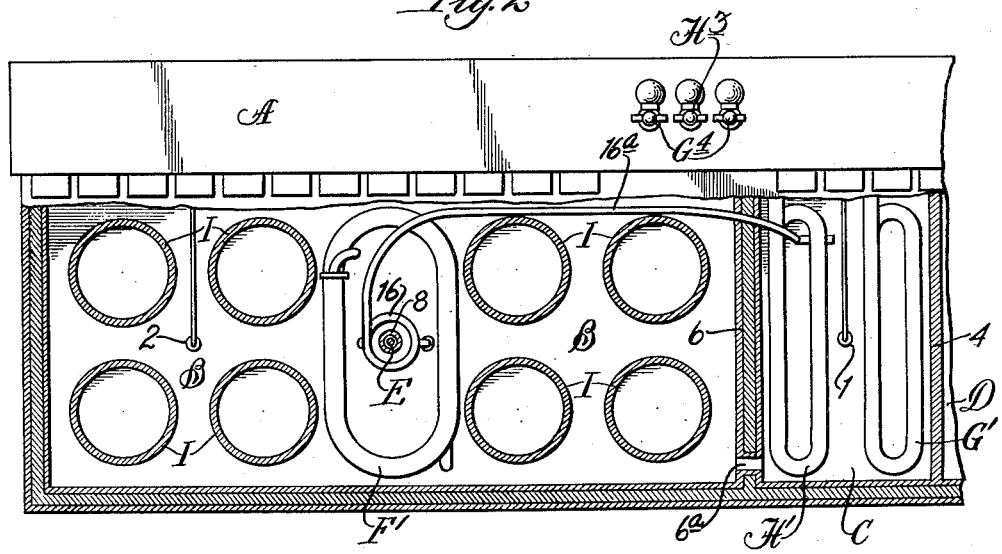
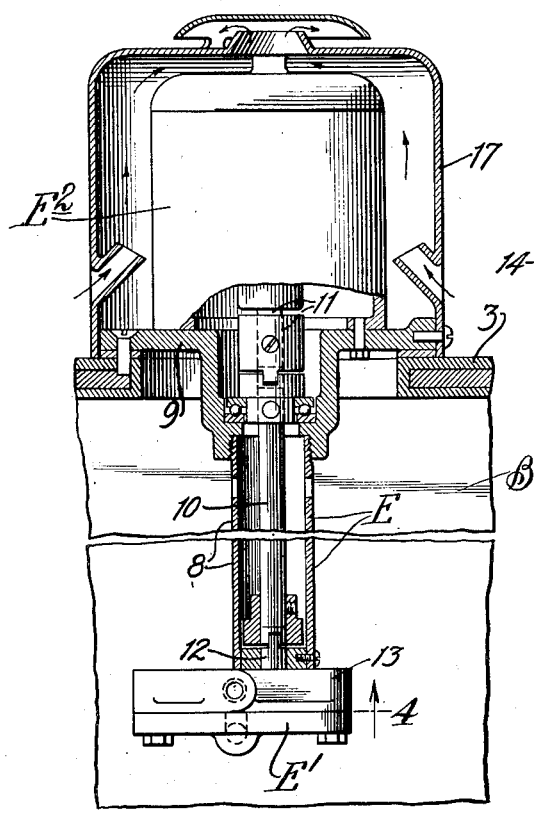
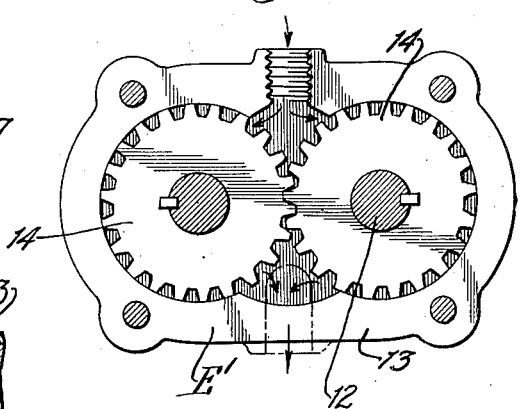

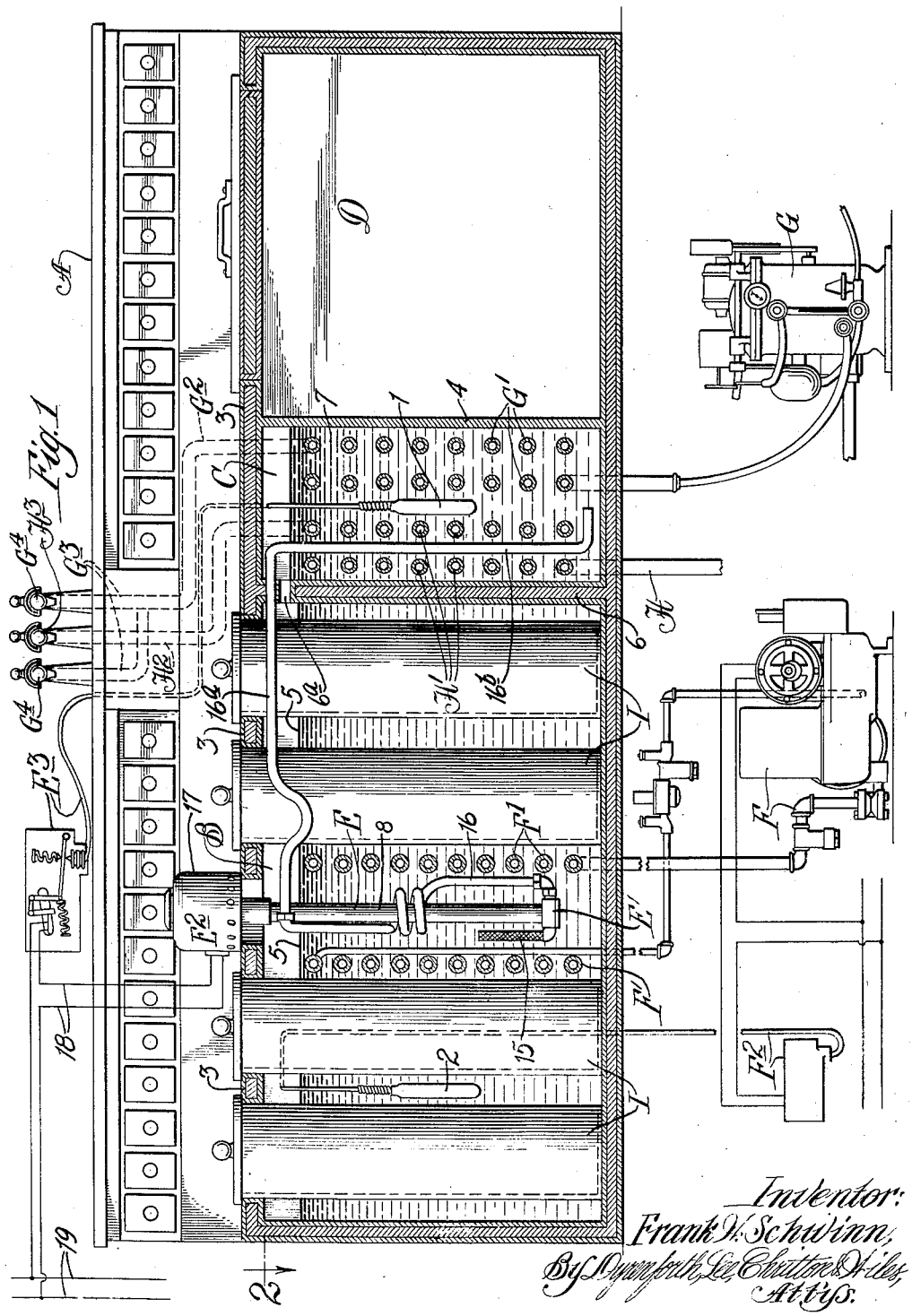

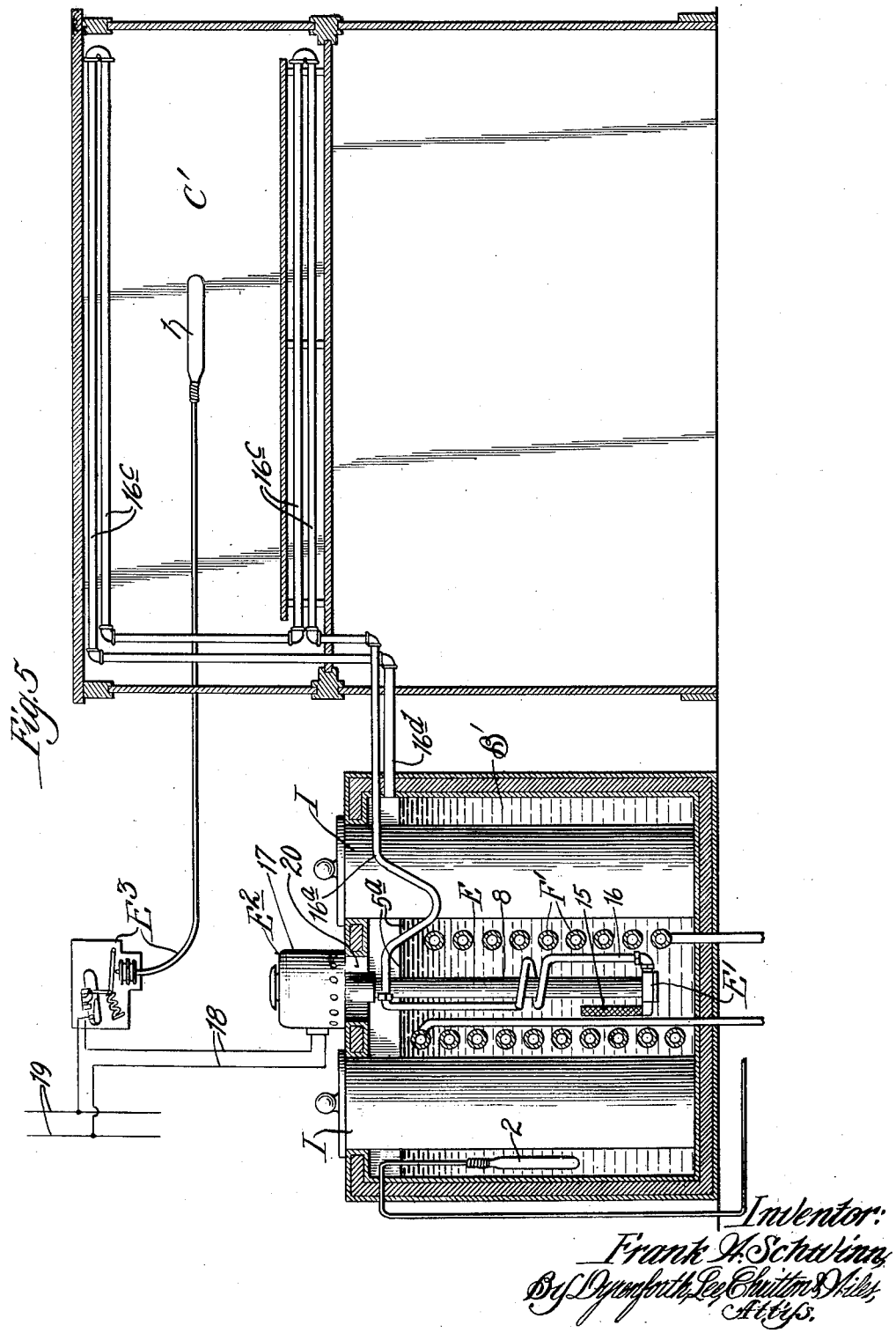

Patented Dec. 29, 1931

1,838,872

UNITED STATES PATENT OFFICE

FRANK W. SCHWINN, OF CHICAGO, ILLINOIS

REFRIGERATING APPARATUS

Application filed March 16, 1928. Serial No. 262,075.

This invention relates particularly to refrigerating apparatus adapted to maintain a freezing temperature in one compartment and a non-freezing refrigerating temperature in another compartment.

The primary object is to provide refrigerating apparatus well adapted to the purpose of preserving ice cream in frozen condition in one compartment and maintaining non-freezing refrigerating temperature in another compartment.

In one form, the apparatus of the invention is well adapted to soda fountain purposes; and in another form, it is well adapted to use in a delicatessen store, where it will enable ice cream to be dispensed from one compartment and will enable butter, meats, eggs, and other products to be maintained at proper temperature in a cabinet, or in a display counter.

The invention is illustrated in preferred embodiments in the accompanying drawings, in which—

Fig. 1 is a vertical sectional view of refrigerating apparatus in connection with a soda fountain, the view showing also in a somewhat diagrammatical way attendant mechanisms; Fig. 2, a broken plan view, partly in section, of the apparatus shown in Fig. 1; Fig. 3, a broken vertical sectional view, on an enlarged scale, showing the pumping mechanism employed; Fig. 4 an enlarged horizontal sectional view taken as indicated at line 4 of Fig. 3; and Fig. 5, a sectional view, diagrammatical in its nature, showing the invention embodied in refrigerating apparatus suitable for use in a delicatessen store, for example.

Referring to the construction shown in Figs. 1-4, A designates a counter, similar to the ordinary soda fountain counters; B, C and D designate, respectively, a freezing temperature brine-tank, a moderate temperature refrigerating-chamber, and a moderate temperature refrigerating dry-chamber; E designates mechanism for circulating brine in the tank B to the compartment C and back, said mechanism comprising a pump $E'$, a motor $E^2$, and a thermostatic device $E^3$ controlling the operation of the motor, the thermostatic device having an element 1 located in the compartment C and the thermostatic device being responsive to changes in temperature in the compartment C; F designates refrigerating mechanism of any desired construction adapted to compress and circulate a refrigerant, said mechanism being provided with an expansion-coil $F'$ located in the tank B and the operation of said mechanism F being controlled by a thermostatic device $F^2$ having an element 2 located in the tank B, said thermostatic device being responsive to changes in temperature in said tank B; G designates carbonating mechanism adapted to supply carbonic acid gas, or carbonated water, to a coil $G'$ located in the compartment C, said coil communicating through a pipe $G^2$ with branch-pipe $G^3$ leading to faucets $G^4$ mounted on the counter A; H designates a water-supply pipe which communicates with a coil $H'$ located in the compartment C, from which coil a pipe $H^2$ leads to a water faucet $H^3$ mounted on the counter A; and I, I designate ice cream cans depending into the tank B.

The counter A and the compartments B, C, and D may be of any suitable construction. In the illustration given, the compartments B, C, and D are disposed back of the counter A and are provided with a top 3 which is disposed at a lower level than the top of the counter A.

The walls of the compartments are shown as suitably insulated except that the partition 4 between the compartments C and D preferably is a heat-conducting partition, such as a wall of sheet-metal.

The tank B contains a non-freezing liquid 5, such as salt brine. Between the tank B and the compartment C is a heat-insulation wall 6, which is provided at its upper portion with an overflow passage $6^a$.

The compartment C, in the construction being described, serves as a brine-tank, containing brine, designated 7.

The thermostatic device $F^2$ serves to keep the brine 5 in the tank B at freezing temperature. For example, the brine may be kept at a point near zero, or slightly above zero, which would ordinarily result in keeping the ice cream at a temperature a little above zero.

On the other hand, it is desirable to have the soda water and ordinary drinking water cooled to a more moderate temperature, say a temperature somewhat above freezing. Thus, for example, the brine in the compartment C may be maintained at a temperature of about 40° F.; and this ordinarily would result in cooling the soda water and ordinary drinking water to a temperature a few degrees above 40° F.

The dry refrigerating compartment D may be at a somewhat higher temperature than that in the compartment C. The compartment D is adapted to receive bottled milk, fresh fruit syrups, packages, or products which are desirably cooled somewhat above 45° F. This compartment being properly insulated and of moderate size may be sufficiently cooled through the heat-conducting wall 4.

The ice cream cans I depend through openings in the top wall 3 of the brine-tank B, and may be removed at will.

The brine-circulating mechanism E comprises, in the illustration given, the pump E', a tubular housing 8 through the medium of which the pump is suspended in the brine-tank, a supporting-plate 9 which is mounted on the top 3 of the tank, the electric motor $E^2$, and a shaft 10 which forms a coupling-member between the armature-shaft 11 and a shaft 12 with which the pump is provided. The pump is shown as comprising a casing 13 and gear-wheels 14 mounted therein and serving to draw the brine in through an intake 15 and force it out through a pipe 16 which is equipped with a lateral extension $16^a$ leading into the auxiliary brine-tank C. Preferably, the laterally extending portion $16^a$ of the pipe is equipped with a portion $16^b$ which depends to the bottom of the tank C. The brine may overflow from the auxiliary tank C into the main brine-tank B through the opening $6^a$.

Instead of extending the pipe 16 in the manner illustrated, it may be extended in any suitable way from the pump to the auxiliary tank C.

The motor $E^2$ is shown mounted on the plate 9 within a housing 17 which is attached to the plate 9. Provision is made for circulating air through the housing, as illustrated.

The thermostatic device $E^3$ may be of any suitable construction. It is shown as controlling the motor-circuit 18 which connects with the line-wires 19. In the operation of the apparatus described, the brine in the main brine-tank B is maintained at a desired temperature, say about zero; and the thermostatic device $E^3$ is set to maintain a non-freezing temperature in the refrigerating compartment C which may be termed an auxiliary brine-tank. For example, the brine in the tank C may be maintained at about 40°–45° F., which will serve to cool the carbonated water in the coil G' and the ordinary drinking water in the coil H' at suitable temperatures.

As water is drawn from the taps $H^3$ and $G^4$, additional water passes into the coils G' and H' and is cooled by the brine in the tank C. This raises the temperature of the brine and the thermostatic device $E^3$ closes the motor-circuit, thus causing the pumping mechanism E to pump colder brine from the main brine-tank B into the auxiliary tank C. During this operation, the brine in the tank C overflows through the opening $6^a$ into the main brine-tank. When the temperature in the tank C is sufficiently reduced the thermostatic device $E^3$ stops the operation of the motor $E^2$.

The compartment D is sufficiently cooled by the transfer of heat through the metal wall 4 to the brine in the tank C.

In the modification illustrated in Fig. 5, B' designates a main brine-tank in which a freezing temperature may be maintained, suitable for keeping ice cream; and C' designates a refrigerating compartment which may, if desired, be in the form of a show-case adapted to preserve and display meats, butter, etc. This apparatus is suitable for use in delicatessen stores, enabling ice cream to be dispensed in such stores and, at the same time, providing for suitably refrigerating meats, butter, and such other products requiring refrigeration as are ordinarily kept in stock in a delicatessen store.

The main brine-tank B' has its top wall provided with holes through which depend ice cream cans I; and the brine-tank is further equipped with pumping mechanism E of the construction heretofore described. The motor surmounts an opening 20 with which the top of the tank is provided, and the pumping mechanism depends into the brine $5^a$. The extension $16^a$ of the discharge-pipe of the pump serves to deliver brine to coils $16^c$ located in the compartment C'. A return-pipe $16^d$ leads back to the brine-tank B'.

In the illustration given, the chamber C' is located at a higher level than is the brine-tank B'. The brine pumped into the coils $16^c$ may be maintained therein by having the level of the brine $5^a$ above the orifice of the return-pipe $16^d$, as illustrated. Any other suitable means may be employed for maintaining the brine in the coils $16^c$. The motor-circuit 18 in the modification being described is controlled by a thermostatic device $E^3$ of the same construction as that illustrated in Fig. 1. In this case, the temperature-responsive element 1 of the thermostatic device is located in the refrigerating chamber C'. The thermostatic device may be set to maintain any desired temperature in the compartment C', such as a temperature of 40–50° F. When the temperature rises above the selecting point, the thermostatic device E³ closes the motor-circuit 18, causing the pump to circulate cold brine from the tank B' through the coils 16ᶜ until the temperature of the compartment C' is sufficiently reduced, whereupon the motor-circuit is automatically broken.

The brine in the tank B' is cooled by an expansion-coil F', and the temperature of the brine in the tank B' is controlled by a thermostatic device, as has been described in connection with the construction shown in Fig. 1. In Fig. 5, the temperature-responsive element 2 of the last-mentioned thermostatic device is shown.

The improved refrigerating apparatus is simple in construction and in operation, and is well adapted to the purpose.

The foregoing detailed description has been given for clearness of understanding only, and no unnecessary limitations should be understood therefrom, but the appended claim should be construed as broadly as permissible, in view of the prior art.

What I regard as new, and desire to secure by Letters Patent, is:

In refrigerating apparatus, a main brine-tank, means for maintaining the brine in said tank at freezing temperature, a moderate-temperature refrigerating compartment, and pumping mechanism comprising an electric motor mounted on the main brine-tank, a pump in the main brine-tank, a tubular member through the medium of which said pump is suspended from the top of the main brine-tank, a coupling-shaft connecting said pump with the armature-shaft of the motor, means for conducting brine from said pump to said moderate-temperature compartment and back to said main brine-tank, and a thermostatic device controlling the circuit of said motor and having an element located in said moderate-temperature compartment and responsive to temperature changes therein.

FRANK W. SCHWINN.